US009086838B2

(12) United States Patent
Panvelwala (10) Patent No.: US 9,086,838 B2
(45) Date of Patent: Jul. 21, 2015

(54) SYNCHRONOUS MEDIA DISPLAY THROUGH AUTOMATIC HARDWARE PROFILES ACROSS MULTIPLE DISPLAY UNITS

(75) Inventor: Abdeali H. Panvelwala, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 180 days.

(21) Appl. No.: 13/602,207

(22) Filed: Sep. 3, 2012

(65) Prior Publication Data
US 2014/0062974 A1 Mar. 6, 2014

(51) Int. Cl.
G09G 5/00 (2006.01)
G06F 3/14 (2006.01)
G09G 5/12 (2006.01)

(52) U.S. Cl.
CPC .............. *G06F 3/1446* (2013.01); *G09G 5/12* (2013.01)

(58) Field of Classification Search
CPC ......... G06F 3/038; G06F 3/14; G06F 3/1423; G09G 5/00; G09G 5/12; G09G 2320/00; H04N 5/04
USPC ........................ 345/1, 1.3, 204, 903; 725/136
See application file for complete search history.

(56) References Cited

U.S. PATENT DOCUMENTS

| 4,635,052 | A | * | 1/1987 | Aoike et al. | ................... 345/211 |
| 5,627,955 | A | | 5/1997 | Gnirss et al. | |
| 6,211,875 | B1 | * | 4/2001 | Lin et al. | ........................ 715/782 |
| 6,275,266 | B1 | | 8/2001 | Morris et al. | |
| 6,430,526 | B1 | | 8/2002 | Toll | |
| 6,628,244 | B1 | * | 9/2003 | Hirosawa et al. | .............. 345/2.3 |
| 6,738,027 | B1 | | 5/2004 | Doolittle et al. | |
| 7,019,723 | B2 | * | 3/2006 | Tsuji | ............................... 345/87 |
| 7,483,031 | B2 | | 1/2009 | Williams et al. | |
| 7,627,890 | B2 | | 12/2009 | Schwartz et al. | |
| 8,026,919 | B2 | | 9/2011 | Aoki | |
| 2005/0020358 | A1 | | 1/2005 | Cram | |

(Continued)

FOREIGN PATENT DOCUMENTS

WO 0219702 A1 3/2002

OTHER PUBLICATIONS http://www.nvidia.in/docs/IO/40049/Quadro_GSync_install_guide_v4.pdf.

(Continued)

*Primary Examiner* — Joe H Cheng
(74) *Attorney, Agent, or Firm* — Zilka-Kotab, PC (57) ABSTRACT

Disclosed are methods, an apparatus and a system of synchronous media display through automatic profiles across multiple display units. A method of a display driver involves automatically identifying a hardware profile data associated with a plurality of display units, applying a logic function to the hardware profile data to create a set of synchronization display settings when a match of the hardware profile data with a set of synchronization display settings in a hardware profile lookup table is not found, and automatically applying the set of synchronization display settings to simultaneously display a sequence of graphics signals across the plurality of display units. The method may also include automatically designating one display unit from the plurality of display units as a master display unit and setting a synchronization timing based on an automatic designation of the one display unit from the plurality of display units as the master display unit.

20 Claims, 7 Drawing Sheets

(56) References Cited

U.S. PATENT DOCUMENTS

| | | | |
|---|---|---|---|
| 2007/0236614 A1* | 10/2007 | Chiu et al. | 348/734 |
| 2010/0091042 A1* | 4/2010 | Inoue | 345/690 |
| 2011/0264622 A1* | 10/2011 | Vargas et al. | 707/618 |
| 2012/0133622 A1 | 5/2012 | Brokken et al. | |
| 2012/0177067 A1 | 7/2012 | Cho et al. | |
| 2014/0062975 A1 | 3/2014 | Panvelwala | |
| 2014/0165111 A1* | 6/2014 | Ko et al. | 725/74 |

OTHER PUBLICATIONS

Nvidia, "NVIDIA Quadro G-Sync II," User Guide, 2011, pp. 1-73, retrieved from www.nvidia.in/docs/IO/40049/Quadro_GSync_install_guide_v4.pdf.

Non-Final Office Action from U.S. Appl. No. 13/602,208, dated Aug. 13, 2014.

Notice of Allowance from U.S. Appl. No. 13/602,208, dated Mar. 10, 2015.

* cited by examiner

SYNCHRONOUS MEDIA DISPLAY THROUGH AUTOMATIC HARDWARE PROFILES ACROSS MULTIPLE DISPLAY UNITS

FIELD OF TECHNOLOGY

This disclosure relates generally to graphics processing technology, and more particularly, to methods, an apparatus and a system of synchronous media display through automatic profiles across multiple display units.

BACKGROUND

A person may wish to use more than one display unit (a screen, a monitor, an LED display, etc.) to show a sequence of images (e.g. a movie, a presentation, a stock ticker, etc.). For example, many screens can be combined to show a movie at a larger size and better resolution than would be possible on any of the smaller screens alone. It may be difficult, however to achieve synchronization of the display units such that the combination of display units shows a single image at any point in time. The temporal synchronization across display units can be complicated by a number of factors. For example, the combination of display units may include a variety of types of hardware (television monitor, computer monitor, projector, etc.) and a variety of models from different manufacturers. A variety of cables or devices could be used to interconnect and communicate with the display units.

Information about the particular hardware set-up may help to optimize the synchronization of the image sequence across the display units. This information may be collected manually by a user, and entered into a computer through a user interface, for use by a display driver. The user may identify information about each kind of hardware device, and each interconnector. If the combination of display includes dozens or hundreds of devices, this process may become tedious and difficult to do by hand. The user may not be in the same physical location as the display units. For example, a display in multiple locations may be controlled by a central server, like broadcast of a sports event, and/or broadcast of a surgical operation to remote experts. Additionally, if there is a change in the hardware setup during display, (e.g. one of the display devices is removed or malfunctions, or a new display unit is added), the user would have to investigate the change and/or communicate information about the changed setup to the display driver. This manual process may cause an interruption in the display of the image sequence and cause mission-critical failure: for example, interrupting the play of a video game, losing important portions of a live broadcast event, and/or even threatening lives if there is an interruption of a display of a live surgery to physicians.

SUMMARY

Disclosed are methods, an apparatus and a system of synchronous media display through automatic profiles across multiple display units. In one aspect, a method of a display driver involves automatically identifying a hardware profile data associated with a set of display units, applying a logic function to the hardware profile data to create a set of synchronization display settings when a match of the hardware profile data with a set of synchronization display settings in a hardware profile lookup table is not found, and automatically applying the set of synchronization display settings to simultaneously display a sequence of graphics signals across the set of display units.

In addition, the method may include automatically designating one display unit from the set of display units as a master display unit. The method may set a synchronization timing based on an automatic designation of the one display unit from display units as the master display unit. The method may automatically designate the set of display units other than the master display unit as a set of slave units. The slave units may follow the synchronization timing set by the master display unit. The method may also include automatically designating a synchronization frequency to be compatible with the hardware profile data. The method may communicate the synchronization timing and/or the synchronization frequency through a synchronization signal sent by the master display unit.

The method may also include automatically monitoring the sequence of graphics signals, reapplying the set of synchronization display settings if the sequence of graphics signals fails to meet a set of performance criteria. The method may report an error if the hardware profile data does not support synchronized display of the sequence of graphics signals, and may also record the error in an error log. The method may generate a view of the synchronization display settings at a display associated with a user. The method may enable the user to create a modified set of synchronization display settings. The method may associate the modified set of synchronization display settings with the hardware profile data. The method may store the modified set of synchronization display settings in the hardware profile lookup table.

The method may associate the modified set of synchronization display settings with the user. The method may generate a view with a set of preferred synchronization display settings based on the modified set of synchronization display settings associated with the user. In addition, the method may automatically detect a change in the hardware profile data according to a set of change criteria. Furthermore, the method may automatically generate a new set of synchronization display settings corresponding to the change in the hardware profile data. The method may apply the new set of synchronization display settings to the set of display units. The method may generate a view at a user display associated with a user (e.g., to alert the user about the change in the hardware profile data and about the new sets of synchronization display settings). The method may enable the user to create a modified set of synchronization display settings.

In another aspect, a method may include displaying a sequence of graphics signals across a set of display units, automatically applying a set of synchronization display settings to the set of display units, and modifying the set of synchronization display settings to correspond to a hardware profile data collected from the set of display units. The method may automatically designate one display unit from the set of display units as a master display unit (e.g., to set a synchronization timing). In addition, the method may automatically designate the display units other than the master display unit as a set of slave units, to follow the synchronization timing set by the master display unit. Furthermore, the method may automatically designate a synchronization frequency to be compatible with the hardware profile data. The method may communicate the synchronization timing and/or the synchronization frequency through the synchronization signal. The method may automatically monitor the sequence of graphics signals and may reapply the set of synchronization display settings if the sequence of graphics signals fails to meet a set of performance criteria. The method may report an error if the hardware profile data does not support synchronized display of the sequence of graphics signals and may record the error in an error log.

The method may generate a view of the set of synchronization display settings at a user display associated with a user, and may enable the user to create a modified set of synchronization display settings. The method may associate the modified set of synchronization display settings with the hardware profile data, and may store the modified set of synchronization display settings in a hardware profile lookup table. The method may also associate the modified set of synchronization display settings with the user, and may generate a view with a set of preferred synchronization display settings based on the set of synchronization display settings associated with the user.

In addition, the method may automatically detect a change in the hardware profile data according to a set of change criteria. A new set of synchronization display settings may be automatically generated corresponding to the change in the set of display units. The method may apply the new set of synchronization display settings to the set of display units. In addition, the method may generate a view at a user display associated with a user (e.g., to alert the user about the change in the hardware profile data and about the new set of synchronization display settings). The method may also enable the user to create a modified set of synchronization display settings.

In yet another aspect a graphics display system includes a data processing device and a set of display units. The data processing device applies a logic function of a display driver to a hardware profile data to create a set of synchronization display settings when a match of the hardware profile data with a set of synchronization display settings in a hardware profile lookup table is not found. The set of display units are communicatively coupled to the data processing device and synchronously operated through the display driver. The graphics display system also may include a synchronization module associated with the data processing device to process the hardware profile data and to automatically generate the set of synchronization display settings. A hardware control module of the data processing device may coordinate a presentation of a sequence of graphics signals across the set of display units, using the set of synchronization display settings.

A timing module of the data processing device may designate one display unit from the set of display units as a master display unit, designate all other display units as slave units, automatically set a synchronization frequency to be compatible with the hardware profile data, and automatically initiate a presentation of a sequence of graphics signals. In addition, a control module may create a modified set of synchronization display settings that are stored in a storage device in association with the hardware profile data. The graphics display system may also include a signal monitoring module to automatically monitor the sequence of graphics signals, trigger a signal display module to reapply the set of synchronization display settings if the sequence of graphics signals fails to meet a set of criteria, and trigger a storage device to associate the set of synchronization display settings with the hardware profile lookup table.

The signal monitoring module may further be configured to automatically detect a change in the set of display units according to a set of change criteria, automatically generate a new synchronization profile corresponding to the change the set of display units, and automatically apply the new synchronization profile to the set of display units.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or an apparatus of automated hardware profiling for synchronous media display across multiple display units, according to one or more embodiments. Although the present embodiments have been described with reference to specific example embodiments, it will be evident that various modifications and changes may be made to these embodiments without departing from the broader spirit and scope of the various embodiments.

In this description, the terms "graphic", "image", "media", "display", "presentation" are all used interchangeably to refer to a signal that is to be displayed across one or more display units. According to one or more embodiments, a signal may encode a wide range of graphic data (e.g. as a movie, photograph, presentation, live broadcast, stock ticker display).

In one embodiment, a method of a display driver 110 (as described in FIG. 1) involves automatically identifying a hardware profile data 102 associated with a set of display units 130, applying a logic function 124 to the hardware profile data 102 to create a set of synchronization display settings 106 when a match of the hardware profile data 102 with a set of synchronization display settings 106 in a hardware profile lookup table 112 is not found, and automatically applying the set of synchronization display settings 106 to simultaneously display a sequence of graphics signals 122 across the set of display units 130.

In another embodiment, a method may include displaying a sequence of graphics signals 122 (as described in FIG. 1) across a set of display units 130, automatically applying a set of synchronization display settings 106 to the set of display units 130, and modifying the set of synchronization display settings 106 to correspond to a hardware profile data 102 collected from the set of display units 130.

In yet another embodiment, a graphics display system 100 (as described in FIG. 1) includes a data processing device 118 and a set of display units 130. The data processing device 118 includes a processor 115. The processor 115 of the data processing system may apply a logic function 124 of a display driver 110 to a hardware profile data 102 to create a set of synchronization display settings 106 when a match of the hardware profile data 102 with a set of synchronization display settings 106 in a hardware profile lookup table 112 is not found. The set of display units 130 are communicatively coupled to the data processing device 118 and synchronously operated through the display driver 110.

Figure 1:
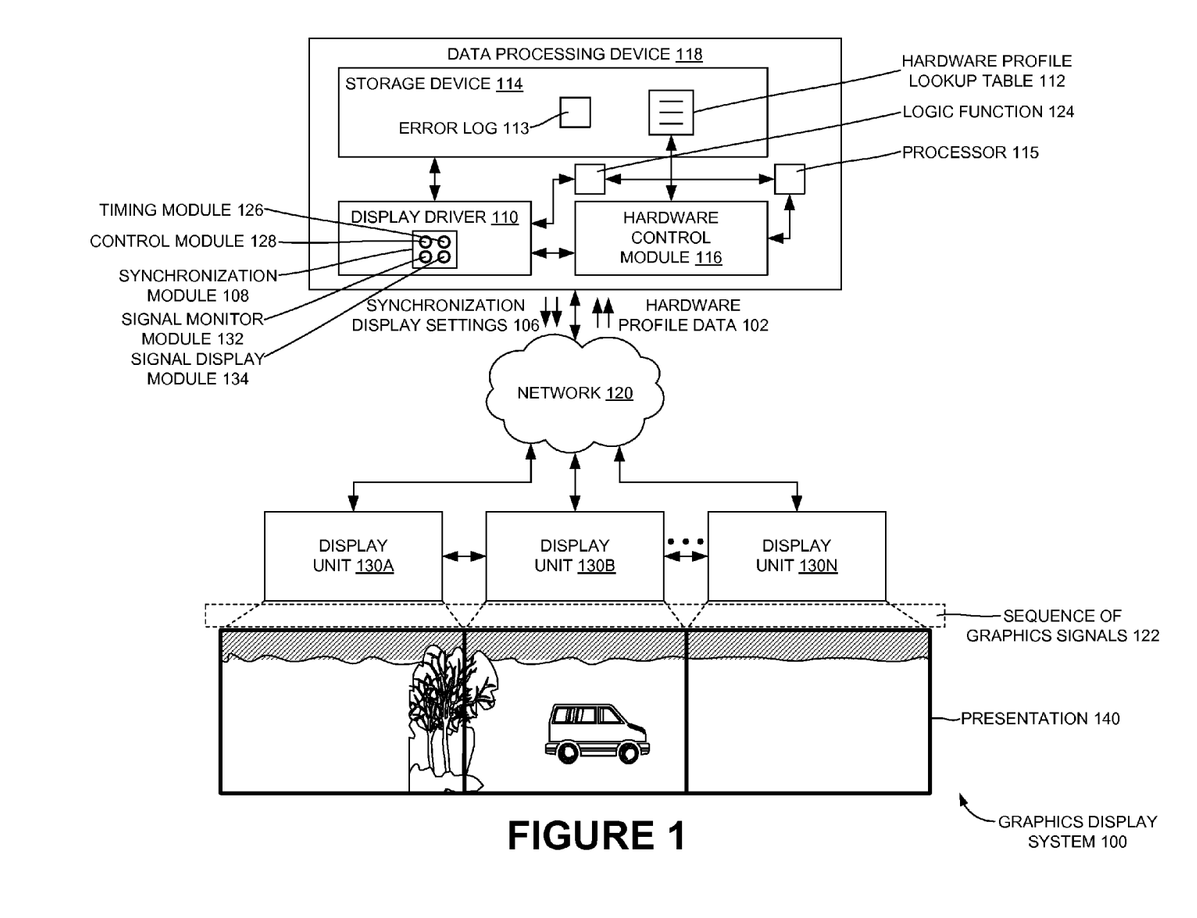
FIG. 1 is a schematic view of a graphics display system, configured to automatically apply a logic function to a hardware profile data to create a set of synchronization display settings when a match of the hardware profile data with a set of synchronization display settings in a hardware profile lookup table is not found, according to one embodiment.

FIG. 1 shows a graphics display system 100, configured to automatically identify a hardware profile data 102 associated with a plurality of graphics display units 130, and to automatically generate a set of synchronization display settings 106. According to one or more embodiments, the set of synchronization display settings 106 may be automatically generated through processing of the hardware profile data 102 in a display driver 110, communicatively coupled to a storage device 114 and also communicatively coupled to a hardware control module 116. The hardware control module 116 is also communicatively coupled to the storage device 114.

According to one or more embodiments, the storage device 114 contains a hardware profile lookup table 112, which is used to match the hardware profile data 102 with a set of synchronization display settings 106. If no match is found, a logic function is applied to the hardware profile data 102 to generate the synchronization display settings (see FIG. 2). According to one or more embodiments, the display driver 110, storage device 114 and hardware control module 116 are part of a data processing device 118, containing standard processor, memory and bus components. The computer is coupled to the plurality of display units through a network 120, according to one or more embodiments. According to one or more embodiments, the set of synchronization display settings 106 are applied automatically to the hardware, to simultaneously display a sequence of graphics signals 122 across the plurality of graphics display units 130, comprised of individual graphics display units 130A-N and may be used to generate a presentation 140 of the sequence of graphics signals.

In one or more embodiments, the hardware profile data 102 may include information associated with the plurality of display units 130. This information may include, for each display unit, a type of device, manufacturer, model, type of cables connecting to the display unit, other connector types, type and number of GPUs connected to each display unit, display dimensions, display frequency, etc. According to one or more embodiments, hardware profile data 102 may be collected and processed from the hardware components of the system whenever a new hardware component is added and/or whenever an existing hardware component is removed from graphics display system 100.

In one or more embodiments the synchronization display settings 106 may include settings specific to each display unit and/or general settings for all display units 130. According to one or more embodiments, general settings may include a synchronization timing 304A and/or a synchronization frequency. These and other settings may be communicated to the display units through a synchronization signal 304.

According to one or more embodiments, the plurality of display units 130 are comprised of a single group of display units showing one sequence of graphics signals 122. For example, showing a movie in a single movie theater, across multiple display units. It will be apparent that the number of display units in a display group may be one, or more than one. In one or more embodiments, there may be many display groups, with each display group comprised of at least one display unit. For example, showing a movie simultaneously in more than one room of a movie theater, or in two different locations. According to one or more embodiments, the set of synchronization display settings 106 may include such parameters as the frequency of display, recovery parameters in case sequence of graphics signals are interrupted for any reason, and the designation of one display unit as a "master" display unit (e.g. 300) to generate synchronization signal 304 and the other display units as a set of "slave" units (e.g. 302, see FIG. 3).

According to one or more embodiments, synchronization module 108 may process the hardware profile data 102 to generate the set of synchronization display settings 106. The synchronization module may retrieve a set of synchronization display settings 106, corresponding to the hardware profile data 102, from the storage device 114. According to one or more embodiments, the display driver 110 may be set up to automatically identify a hardware profile data 102 or may alternatively be set up to allow manual input of the hardware profile data from a user 402. In one or more embodiments, the hardware profile lookup table 112 may store a variety of information about possible display devices, cables and the hardware profile data 102. In one or more embodiments the hardware profile lookup table 112 stores a match between a hardware profile data 102 and a corresponding set of synchronization display settings 106. The match may be stored as a result of a prior successful use of the set of synchronization display settings 106 with the hardware profile data 102, or may be based on parameters that make a particular set of synchronization display settings 106 more likely to work with the particular of hardware profile data 102.

In one or more embodiments, the display units 130 may all be comprised of the same kind of device and connections, whereas in one or more other embodiments, the display devices may differ from each other along one or more parameters. According to one or more embodiments, a display unit, e.g. display unit 130A, may be any of a number of kinds of display devices, including a projector, monitor, vacuum tube display, LED display panel, etc. According to one or more embodiments, images may be shown on a display unit itself (e.g. a monitor, LED display panel), or on an external display surface (e.g. a screen, a wall, floor).

Figure 2:
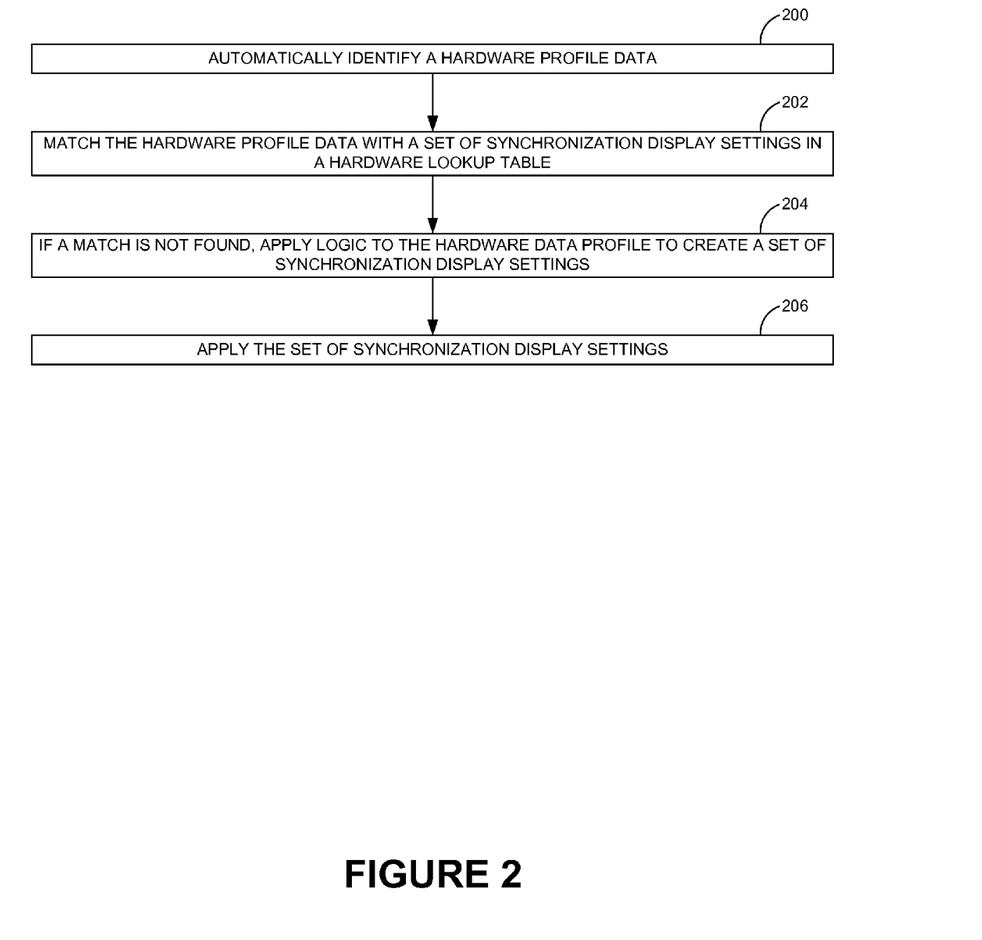
FIG. 2 is a process flow diagram detailing the operations involved in applying a logic function to the hardware profile data to create a set of synchronization display settings when a match of the hardware profile data with a set of synchronization display settings in a hardware profile lookup table is not found, according to one embodiment.

FIG. 1 is a schematic view of a graphics display system 100, configured to automatically apply a logic function 124 to a hardware profile data 102 to create a set of synchronization display settings 106 when a match of the hardware profile data 102 with a set of synchronization display settings 106 in a hardware profile lookup table 112 is not found, according to one embodiment. In FIG. 1, the data processing device 118 is illustrated as communicatively coupled to a set of display units 130 through the network 120. The presentation 140 is an output of the display units 130 may work together synchronously to provide a coordinated and the presentation 140 of a media output desired by a user 402 (as shown in FIG. 2) of the data processing device 118 in a cohesive and synchronized form.

The data processing device 118 includes a display driver 110, a storage device 114, a processor 115, and a hardware control module 116. A logic function 124 may be performed and executed by the processor 115 when communicated from the display driver 110, according to one embodiment. The display driver 110 includes a synchronization module 108. The synchronization module 108 automatically configures and synchronizes the display units 130 to create the presentation 140, according to one embodiment. The display driver 110 may be set of instructions that when executed through the processor 115 of the data processing device 118 enable the data processing device 118 to communicate with video cards, display units 130, and perform the operations of automatic synchronization as described in the various embodiments.

The data processing device 118 may be a general and/or specific purpose computing system having a processor 115, a random access memory, a set of controller cards including one or more video controller cards, and a storage device 114 having an operating system and a set of applications. The display units 130 may be video projection devices and/or flat panel displays (e.g., liquid crystal, active matrix, plasma, etc.) that act in coordination with each other to produce the presentation 140. The presentation 140 may be an output of a media file stored in a non-volatile (e.g., the storage device 114) and/or volatile memory (e.g., in a random access memory of the data processing device 118 accessed from a remote source through the network 120). For example, the media file may be a movie, an animation, an advertisement, and/or an interactive display.

A synchronization module 108 may include a number of sub-modules include a timing module 126, a control module 128, a signal monitor module 132, and a signal display module 134. A timing module 126 of the data processing device 118 may designate one display unit from the set of display units 130 as a master display unit 300 (e.g. illustrated in FIG. 3 to be the display unit 130A), according to one embodiment. The timing module 126 may also designate all other display units 130 as slave units (illustrated in FIG. 3 to be the display units 130B-130N). The timing module 126 may automatically set a synchronization frequency 304B to be compatible with the hardware profile data 102, and automatically initiate a presentation 140 of a sequence of graphics signals 122.

The control module 128 may create a modified set of synchronization display settings 106 that are stored in a storage device 114 in association with the hardware profile data 102. The signal monitor module 132 may automatically monitor the sequence of graphics signals 122. The signal monitor module 132 may also trigger a storage device 114 to associate the set of synchronization display settings 106 with the hardware profile lookup table 112. The signal monitor module 132 may further be configured to automatically detect a change in the set of display units 130 according to a set of change criteria, automatically generate a new synchronization profile corresponding to the change the set of display units 130, and automatically apply the new synchronization profile to the set of display units 130.

In addition, the signal monitor module 132 may trigger a signal display module 134. The signal display module 134 may reapply the set of synchronization display settings 106 if the sequence of graphics signals 122 fails to meet a set of criteria.

In one embodiment, a method of a display driver 110 of FIG. 1 involves automatically identifying a hardware profile data 102 associated with a set of display units 130, applying a logic function 124 to the hardware profile data 102 to create a set of synchronization display settings 106 when a match of the hardware profile data 102 with a set of synchronization display settings 106 in a hardware profile lookup table 112 is not found, and automatically applying the set of synchronization display settings 106 to simultaneously display a sequence of graphics signals 122 across the set of display units 130.

In another embodiment, a method may include displaying a sequence of graphics signals 122 across a set of display units 130, automatically applying a set of synchronization display settings 106 to the set of display units 130, and modifying the set of synchronization display settings 106 to correspond to a hardware profile data 102 collected from the set of display units 130.

In yet another embodiment, a graphics display system 100 includes a data processing device 118 and a set of display units 130. The data processing device 118 includes a processor 115. The processor 115 of the data processing system may apply a logic function 124 of a display driver 110 of FIG. 1 to a hardware profile data 102 to create a set of synchronization display settings 106 when a match of the hardware profile data 102 with a set of synchronization display settings 106 in a hardware profile lookup table 112 is not found. The set of display units 130 are communicatively coupled to the data processing device 118 and synchronously operated through the display driver 110 of FIG. 1.

In one embodiment, a method of a display driver 110 of FIG. 1 involves automatically identifying a hardware profile data 102 associated with a set of display units 130, applying a logic function 124 to the hardware profile data 102 to create a set of synchronization display settings 106 when a match of the hardware profile data 102 with a set of synchronization display settings 106 in a hardware profile lookup table 112 is not found, and automatically applying the set of synchronization display settings 106 to simultaneously display a sequence of graphics signals 122 across the set of display units 130.

Figure 3:
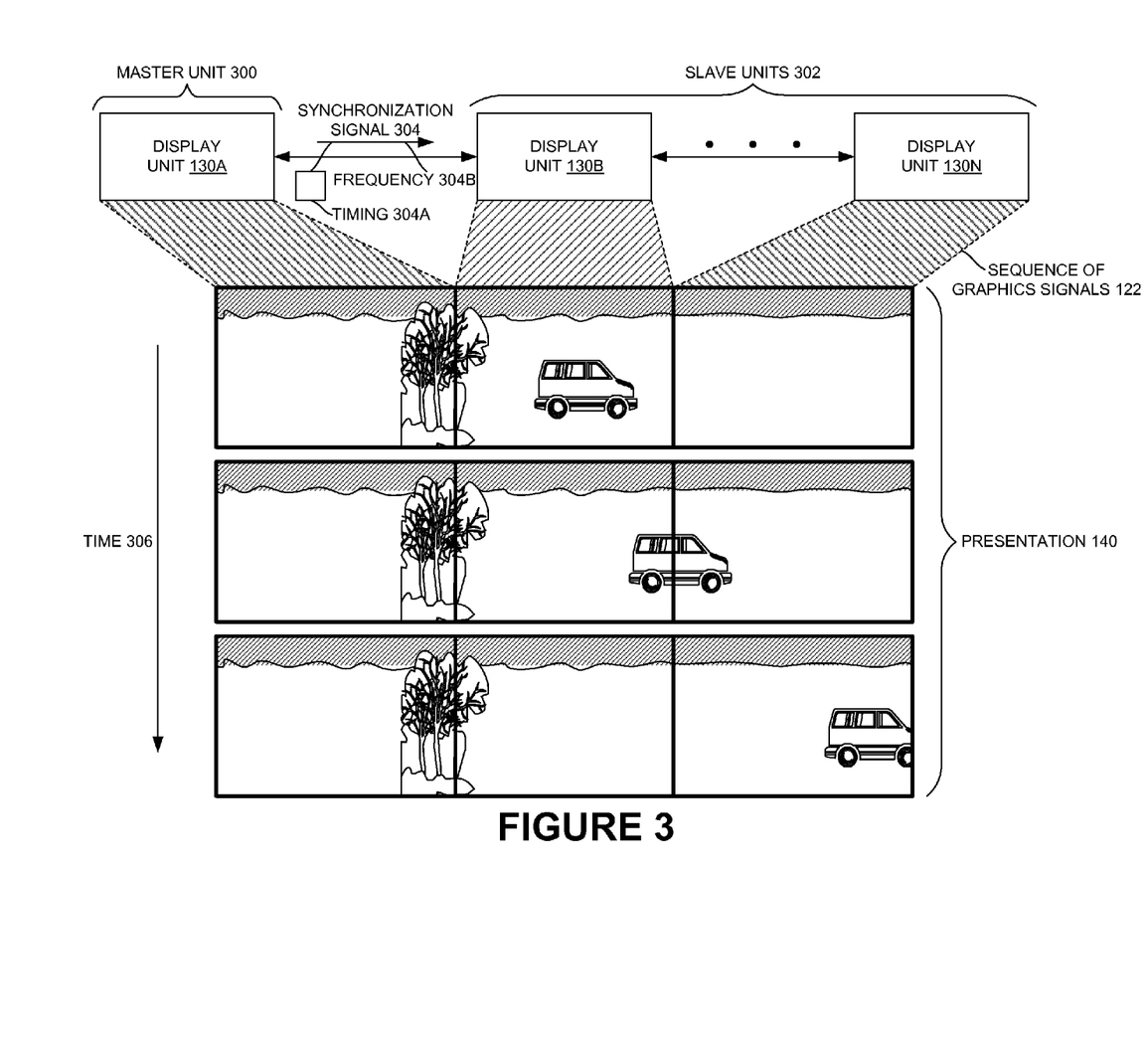
FIG. 3 is a schematic view of the coordination between a master display unit and slave display units to coordinate a presentation of a sequence of graphics signals, according to one embodiment.

In addition, the method may include automatically designating one display unit from the set of display units 130 as a master display unit 300 (e.g. illustrated in FIG. 3 to be the display unit 130A). The method may set a synchronization timing 304A based on an automatic designation of the one display unit from display units 130 as the master display unit 300 (e.g. illustrated in FIG. 3 to be the display unit 130A). The method may also include automatically monitoring the sequence of graphics signals 122, reapplying the set of synchronization display settings 106 if the sequence of graphics signals 122 fails to meet a set of performance criteria. The method may report an error if the hardware profile data 102 does not support synchronized display of the sequence of graphics signals 122, and may also record the error in an error log 113. The method may generate a view of the synchronization display settings 106 at a display (e.g., any one of the display units 130) associated with a user 402. The method may enable the user 402 to create a modified set of synchronization display settings 106. The method may associate the modified set of synchronization display settings 106 with the hardware profile data 102. The method may store the modified set of synchronization display settings 106 in the hardware profile lookup table 112.

The method may associate the modified set of synchronization display settings 106 with the user 402. The method may generate a view with a set of preferred synchronization display settings 106 based on the modified set of synchronization display settings 106 associated with the user 402. In addition, the method may automatically detect a change in the hardware profile data 102 according to a set of change criteria. Furthermore, the method may automatically generate a new set of synchronization display settings 106 corresponding to the change in the hardware profile data 102. The method may apply the new set of synchronization display settings 106 to the set of display units 130. The method may generate a view at a user 402 display associated with a user 402 (e.g., to alert the user 402 about the change in the hardware profile data 102 and about the new sets of synchronization display settings 106). The method may enable the user 402 to create a modified set of synchronization display settings 106.

In another embodiment, a method may include displaying a sequence of graphics signals 122 across a set of display units 130, automatically applying a set of synchronization display settings 106 to the set of display units 130, and modifying the set of synchronization display settings 106 to correspond to a hardware profile data 102 collected from the set of display units 130. The method may automatically designate one display unit from the set of display units 130 as a master display unit 300 (e.g. illustrated in FIG. 3 to be the display unit 130A) (e.g., to set a synchronization timing 304A). In addition, the method may automatically designate the display units 130 other than the master display unit 300 (e.g. illustrated in FIG. 3 to be the display unit 130A) as a set of slave units (illustrated in FIG. 3 to be the display units 130B-130N), to follow the synchronization timing 304A set by the master display unit 300 (e.g. illustrated in FIG. 3 to be the display unit 130A). Furthermore, the method may automatically designate a synchronization frequency 304B to be compatible with the hardware profile data 102. The method may communicate the synchronization timing 304A and/or the synchronization frequency 304B through the synchronization signal 304. The method may automatically monitor the sequence of graphics signals 122 and may reapply the set of synchronization display settings 106 if the sequence of graphics signals 122 fails to meet a set of performance criteria. The method may report an error if the hardware profile data does not support synchronized display of the sequence of graphics signals 122 and may record the error in an error log 113.

The method may generate a view of the set of synchronization display settings 106 at a user 402 display associated with a user 402, and may enable the user 402 to create a modified set of synchronization display settings 106. The method may associate the modified set of synchronization display settings 106 with the hardware profile data 102, and may store the modified set of synchronization display settings 106 in a hardware profile lookup table 112. The method may also associate the modified set of synchronization display settings 106 with the user 402, and may generate a view with a set of preferred synchronization display settings 106 based on the set of synchronization display settings 106 associated with the user 402.

In addition, the method may automatically detect a change in the hardware profile data 102 according to a set of change criteria. A new set of synchronization display settings 106 may be automatically generated corresponding to the change in the set of display units 130. The method may apply the new set of synchronization display settings 106 to the set of display units 130. In addition, the method may generate a view at a user 402 display associated with a user 402 (e.g., to alert the user 402 about the change in the hardware profile data 102 and about the new set of synchronization display settings 106). The method may also enable the user 402 to create a modified set of synchronization display settings 106.

In yet another embodiment, a graphics display system 100 includes a data processing device 118 and a set of display units 130. The data processing device 118 applies a logic function 124 of a display driver 110 of FIG. 1 to a hardware profile data 102 to create a set of synchronization display settings 106 when a match of the hardware profile data 102 with a set of synchronization display settings 106 in a hardware profile lookup table 112 is not found. The set of display units 130 are communicatively coupled to the data processing device 118 and synchronously operated through the display driver 110 of FIG. 1. The graphics display system 100 also may include a synchronization module associated with the data processing device 118 to process the hardware profile data 102 and to automatically generate the set of synchronization display settings 106. A hardware control module 116 of the data processing device 118 may coordinate a presentation 140 of a sequence of graphics signals 122 across the set of display units 130, using the set of synchronization display settings 106.

FIG. 2 is a process flow diagram detailing the operations involved in applying a logic function 124 to the hardware profile data 102 to create a set of synchronization display settings 106 when a match of the hardware profile data 102 with a set of synchronization display settings 106 in a hardware profile lookup table 112 is not found, according to one embodiment. In operation 200, a hardware profile data 102 may be automatically identified. In operation 202, the hardware profile data 102 may be matched with a set of synchronization display settings 106 in a hardware profile lookup table 112. In operation 204, if a match is not found, a logic function 124 may be applied to the hardware profile data 102 to create a set of synchronization display settings 106. Then, in operation 206, he set of synchronization display settings 106 may be applied to the display units 130 to create the presentation 140.

FIG. 3 is a schematic view of the coordination between a master display unit 300 and slave display units 302 to coordinate a presentation of a sequence of graphics signals 122, according to one embodiment. FIG. 3 illustrates a concept in which one of the display units 130 may be a master display unit 300 (illustrated as display unit 130A), while other display units (130B-130N) are slave display units. Also illustrated in FIG. 3 is the concept that the various display units 130 work together in concert to form the presentation 140. The resolution of the presentation 140 may be greater than any one of the display units 130 individually because of the synchronization made possible by the various display units 130 using the display driver 110, according to one embodiment. The presentation 140 may seamlessly progress across the axis of time 306 in a coordinated and synchronized form according to one embodiment.

The method may automatically designate the set of display units 130 other than the master display unit 300 (e.g. illustrated in FIG. 3 to be the display unit 130A) as a set of slave units (illustrated in FIG. 3 to be the display units 130B-130N). The slave units (illustrated in FIG. 3 to be the display units 130B-130N) may follow the synchronization timing 304A set by the master display unit 300 (e.g. illustrated in FIG. 3 to be the display unit 130A). The method may also include automatically designating a synchronization frequency 304B to be compatible with the hardware profile data 102. The method may communicate the synchronization timing 304A and/or the synchronization frequency 304B through a synchronization signal 304 sent by the master display unit 300 (e.g. illustrated in FIG. 3 to be the display unit 130A).

Figure 4:
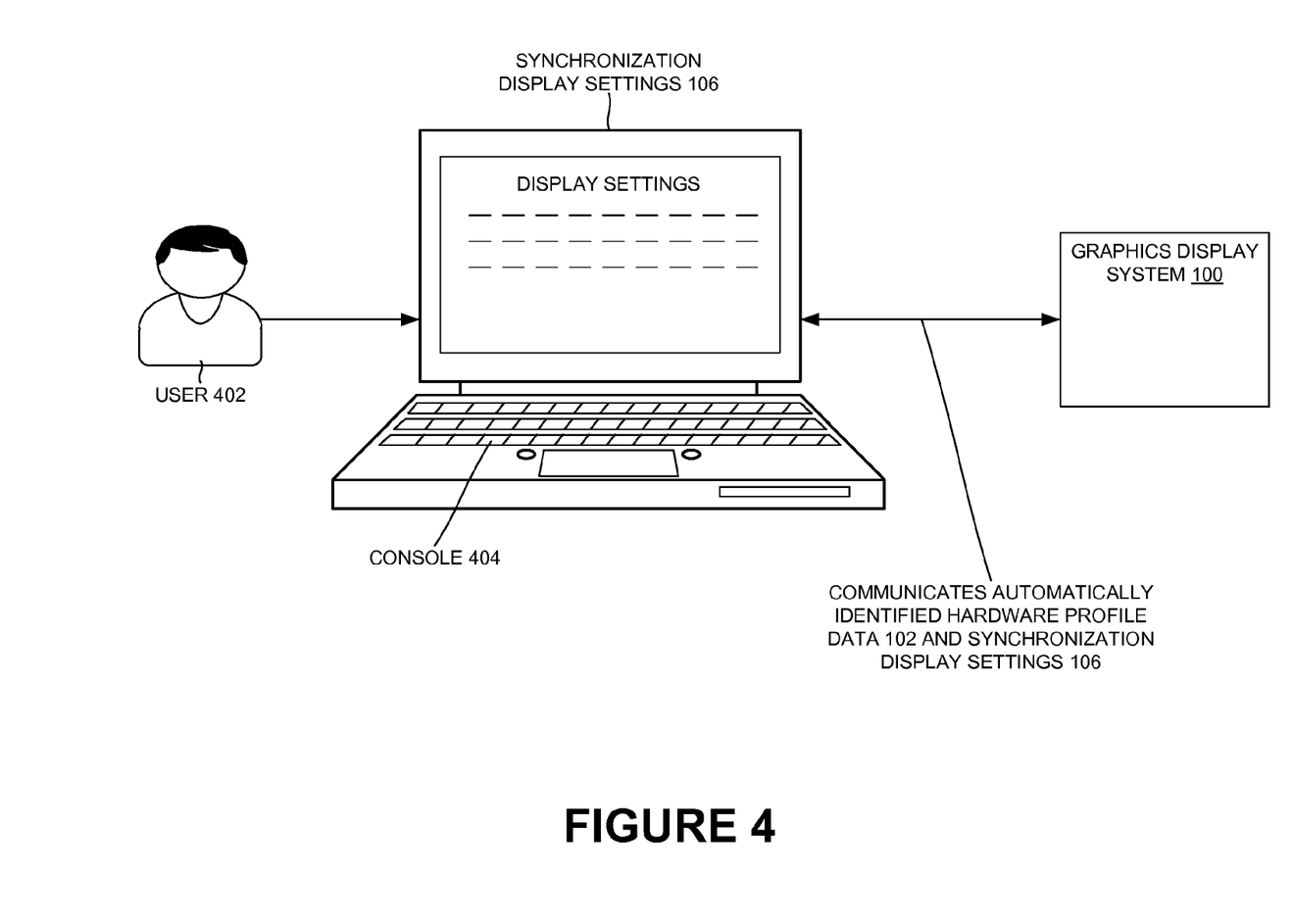
FIG. 4 is a schematic view of a user display to present to a user with the synchronized display settings automatically generated by the graphics display system, and enabling the user to modify the synchronization display settings, according to one embodiment.

FIG. 4 is a schematic view of the synchronization display settings 106 automatically generated by the graphics display system 100, and enabling the user 402 to modify the synchronization display settings 106, according to one embodiment. Particularly, FIG. 4 shows a set of synchronization display settings 106 that area automatically set to synchronously control the display units 130 based on the various embodiments described herein. The console 404 (e.g., an input device, a serially connected computer to the graphics display system 100) of the user 402 may automatically communicate the hardware profile data 102 and/or synchronization display settings 106 to the graphics display system 100, according to one embodiment.

Figure 5:
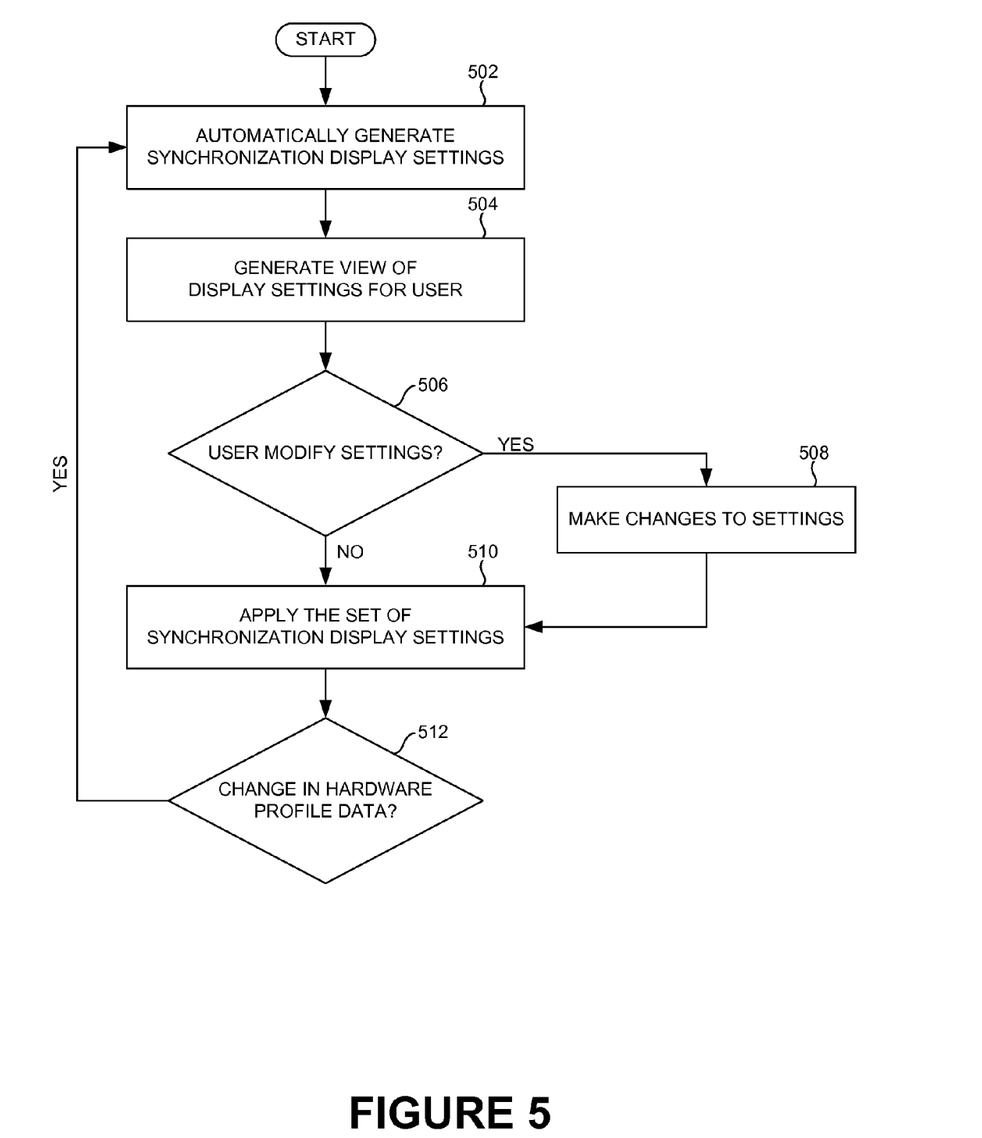
FIG. 5 is a process flow diagram detailing the operations involved in synchronized display settings automatically generated by the graphics display system, according to one embodiment.

FIG. 5 is a process flow diagram detailing the operations involved in synchronization display settings 106 automatically generated by the graphics display system 100, according to one embodiment. In operation 502, synchronization display settings 106 may be automatically generated. In operation 504, a view of display settings for the user may be provided. Then, the user may determine whether they wish to manually modify the automatically created display settings in operation 504. If the user selects 'No' the automatically generated synchronization display settings may be applied similarly as in operation 206 of FIG. 2. If the user selects 'Yes', changes to the settings may be made in operation 508. The user may still have an option to make changes to the hardware profile data in operation 512 whether they select 'No' or 'hyes' in modifying user settings in operation 506. The hardware profile settings may be automatically set as previously described in operation 200 of FIG. 2.

Figure 6:
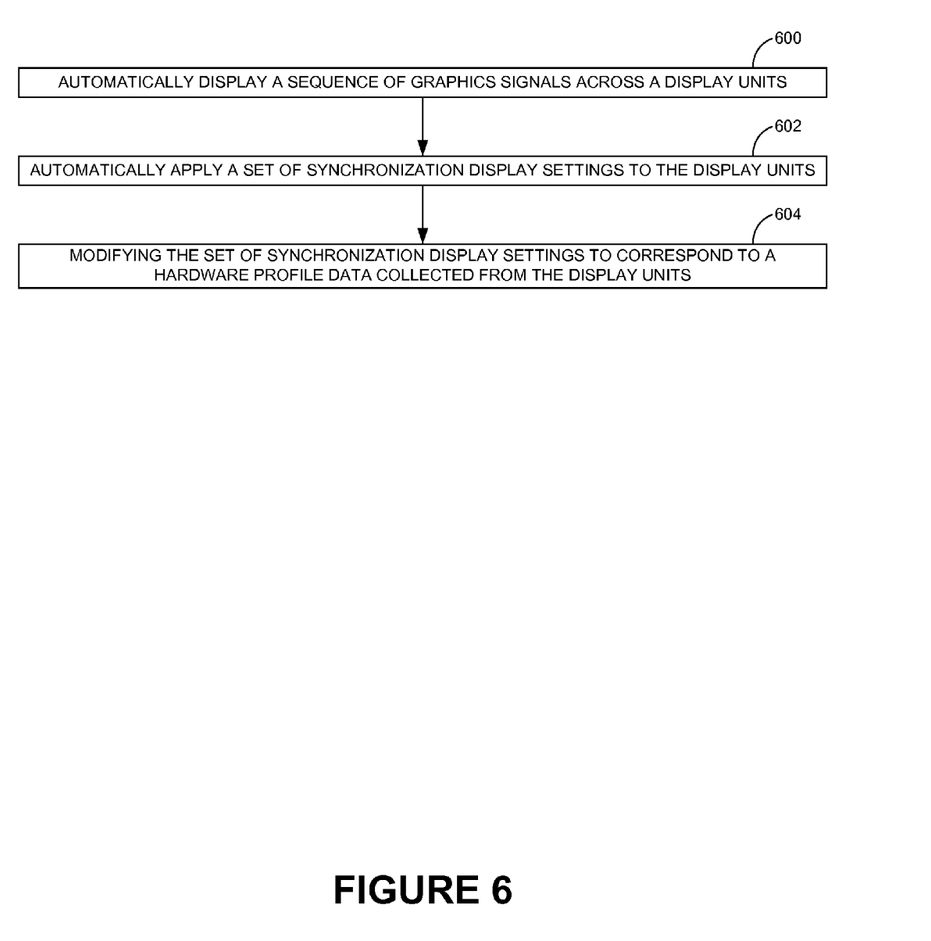
FIG. 6 is a process flow diagram detailing the operations involved in enabling the user 402 to modify the synchronization display settings, according to one embodiment.

FIG. 6 is a process flow diagram detailing the operations involved in enabling the user 402 to modify the synchronization display settings 106, according to one embodiment. In operation 600, a sequence of graphics signals 122 may be automatically displayed across a plurality of display units 130 to create the presentation 140. Then, in operation 602, a set of synchronization display settings 106 may be automatically applied to any number of display units 130. Next, in operation 604, the set of synchronization display settings 106 may be modified to correspond to a hardware profile data 102 collected from display units 130.

Figure 7:
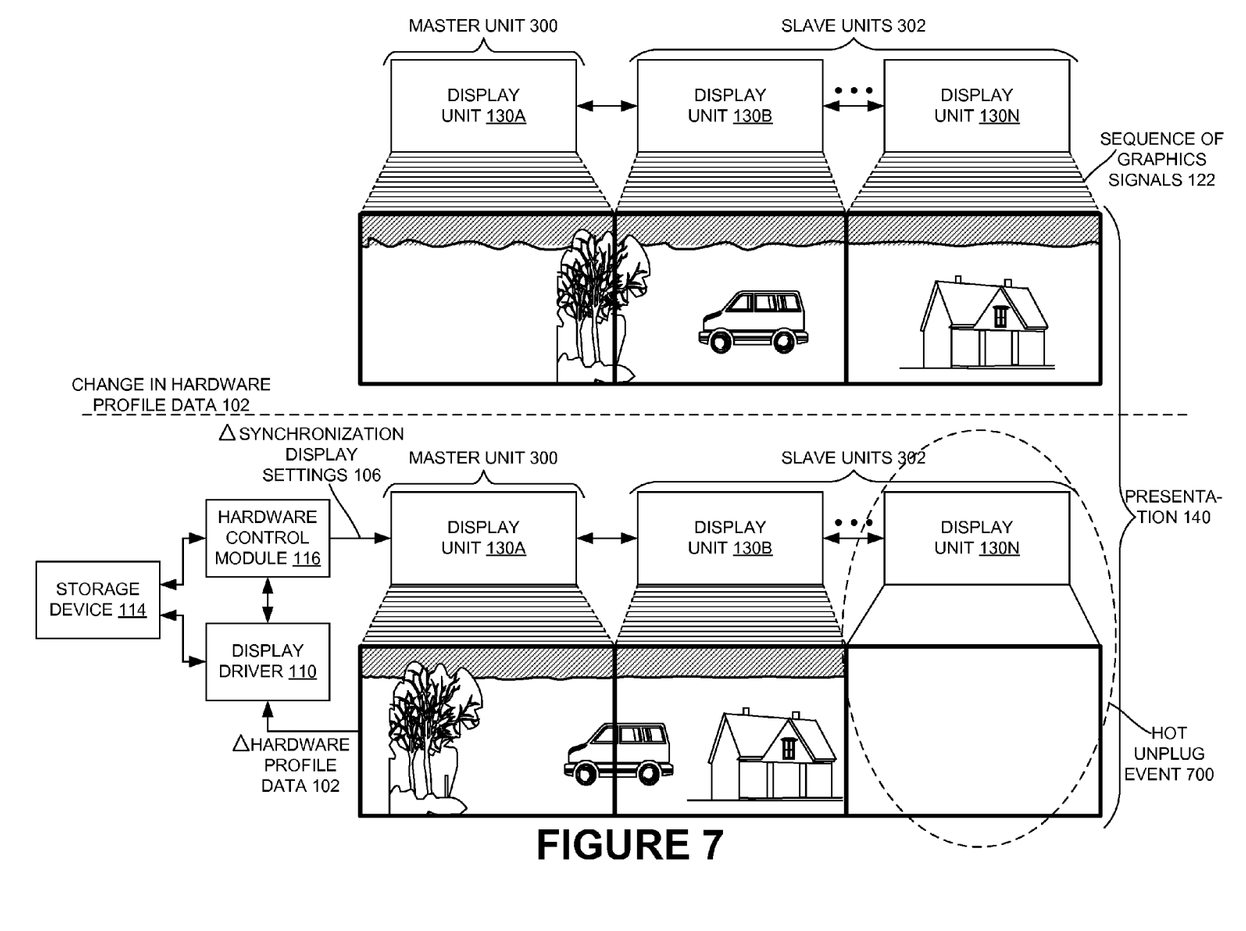
FIG. 7 is a schematic view of the response of the graphics display system to a change in the hardware profile data, in particular a "hot unplug" event removing one of the display units, according to one embodiment.

FIG. 7 is a schematic view of the response of the graphics display system 100 to a change in the hardware profile data 102, in particular a hot unplug event 700 removing one of the display units 130. With such a change, the graphics display system 100 registers a change in the hardware profile data 102 and generates a changed set of synchronization display settings 106, according to one embodiment. Particularly, in FIG. 7, a hot unplug event 700 may mean that one or more of the display units 130 are removed while the power to them and to the data processing device 118 is still on. In such an instance, the embodiment shown in FIG. 7 automatically reconfigures itself based on the display unit no longer active. As shown in the bottom FIG. 7, the display unit 130N is hot swapped in the system and is no longer active. In such a scenario, the system would automatically reconfigure itself so that the presentation 140 may continue with the entire media displayed through the remaining display units only. As shown in FIG. 7, the display unit 130A (master display unit 300) and the display unit 130B (one of the slave units 302) show the entire media presentation including the car and the house in the absence of the hot unplugged one of the display unit 130N which was removed. The top portion of FIG. 7 shows the media being displayed in its complete form prior to the hot unplug event 700 using all displays, including display unit 130N.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing device (e.g., a computer device). Accordingly, the specification and drawings are to be regarded in an illustrative rather than a restrictive sense.

What is claimed is:
1. A method comprising:
   automatically identifying hardware profile data associated with a plurality of display units;
   creating a set of synchronization settings when the hardware profile data does not match a set of settings in a hardware profile lookup table; and
   automatically applying the set of synchronization settings to simultaneously display a sequence of graphics signals across the plurality of display units.
2. The method of claim 1, wherein creating the set of synchronization settings comprises retrieving synchronization settings that correspond to the hardware profile data from a storage device.
3. The method of claim 1, wherein the hardware profile data is manually input by a user.
4. The method of claim 1, wherein the hardware profile data is collected from the set of display units.
5. The method of claim 1, wherein the hardware profile lookup table includes information corresponding to a plurality of possible display devices and cables.
6. The method of claim 1, wherein the synchronization settings include at least one of a synchronization timing and a synchronization frequency.
7. The method of claim 1, wherein one display unit in the plurality of display units is designated as a master display unit, and wherein one or more additional display units in the plurality of display units are designated as slave units, and wherein the master display unit communicates a synchronization signal to each of the slave units, the synchronization signal including at least one of a synchronization timing and a synchronization frequency.
8. The method of claim 1, further comprising:
   generating a view of the synchronization settings for a user; and
   upon determining that the user would like to manually modify the synchronization settings, modifying the synchronization settings based on user input.
9. The method of claim 8, further comprising modifying the synchronization settings based on a change in the hardware profile data triggered by a hot unplug event.

10. A system comprising:
a plurality of display units; and
a data processing device communicatively coupled to the plurality of display units, the data processing device configured to:
   automatically identify hardware profile data associated with a plurality of display units;
   create a set of synchronization settings when the hardware profile data does not match a set of settings in a hardware profile lookup table; and
   automatically apply the set of synchronization settings to simultaneously display a sequence of graphics signals across the plurality of display units.

11. The system of claim 10, wherein the synchronization settings include at least one of a synchronization timing and a synchronization frequency.

12. The system of claim 10, wherein the data processing device includes a display driver associated with the plurality of display units.

13. The system of claim 12, wherein the display driver includes a synchronization module configured to process the hardware profile data and automatically create the set of topology settings.

14. The system of claim 13, wherein creating the set of synchronization settings comprises retrieving synchronization settings that correspond to the hardware profile data from a storage device.

15. The system of claim 13, wherein the synchronization module includes:
a timing module configured to:
   designate one display unit in the plurality of display units as a master display unit,
   designate all other display units in the plurality of display units other than the master display unit as slave units,
   automatically set a synchronization frequency that is compatible with the hardware profile data, and
   automatically initiate a presentation of the sequence of graphics signals;
a control module configured to create a modified set of synchronization settings;
a signal monitoring module configured to monitor the sequence of graphics signals; and
a signal display module configured to apply the set of synchronization settings to the plurality of display units.

16. The system of claim 12, wherein the display driver is configured to modify the synchronization settings based on a change in the hardware profile data triggered by a hot unplug event.

17. The system of claim 10, wherein the hardware profile data is collected from the plurality of display units.

18. The system of claim 10, wherein the hardware profile lookup table includes information corresponding to a plurality of possible display devices and cables.

19. The system of claim 10, wherein the synchronization settings include at least one of a number of display units in the plurality of display units, a shape of each display unit in the plurality of display units, and a scaling factor for each display unit in the plurality of display units.

20. The system of claim 10, further including a storage device that stores the hardware profile data and the hardware profile lookup table.

* * * * *